Jan. 12, 1932.  F. BROWN  1,840,484
TOOTHBRUSH
Filed Sept. 13, 1930

INVENTOR.
Franklin Brown
BY
J. Kaplan
ATTORNEY.

Patented Jan. 12, 1932

1,840,484

UNITED STATES PATENT OFFICE

FRANKLIN BROWN, OF WHITEHOUSE, NEW JERSEY, ASSIGNOR TO GENERAL HEALTH CORPORATION, OF PHILADELPHIA, PENNSYLVANIA, A CORPORATION OF DELAWARE

TOOTHBRUSH

Application filed September 13, 1930. Serial No. 481,794.

This invention relates to teeth cleaning devices especially adapted for cleaning children's teeth.

The invention consists of a resilient elongated body member made from rubber or the like and provided with corrugations or teeth on its face and a handle member at the end for manipulating the device in the mouth of the child. Between the body member and the handle member is a guard in the form of a disk for preventing the instrument from being swallowed accidently by the infant or child. The entire device is molded from one piece of pure Pará rubber so it will have the desired amount of resiliency to conform to the contour of the teeth or gums when being cleaned. This kind of rubber is smooth and free from any abrasive so if the device is used to massage the gums or teeth, (as this is in other use to which the invention can be put to), there will be no injury caused to the massaged parts. The corrugations form pockets for holding the tooth paste or powder while the top ridges of the corrugations are adapted to come in contact with the teeth to be cleaned.

My invention consists in certain other novel features and combinations such as will be more fully described hereinafter and particularly pointed out in the claims.

In the accompanying drawings

Figure 8 is a diagrammatic view showing the device in the act of cleaning the teeth.

Figure 1:
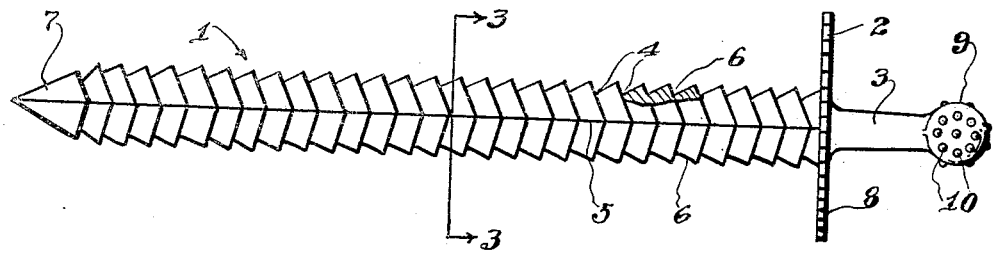
Figure 1 is a view of one form of the teeth cleaning device.
Figure 3:
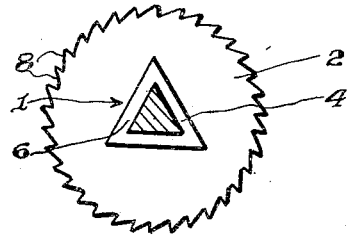
Figure 3 is a section on line 3—3 of Figure 1.

Referring now to the drawings in detail:

Numeral 1 designates the elongated body member, 2 the guard or disk member and 3 the handle member. The body member as shown in Figure 3 is triangular in cross section and the face thereof is provided with saw tooth corrugations 4. The corrugations run obliquely and meet in the center 5. The ridges of the corrugations are used to clean or massage the teeth or gum while the corrugations themselves form pockets 6 for holding the cleaning material such as powder or paste. The end of the body member is pointed as at 7 and is used for cleaning out the crevices or the places between the teeth.

The guard or disk member is made of relatively thinned material and around the periphery thereof are formed a series of teeth 8. This detail of the invention or guard member has two functions. One purpose is to prevent the instrument from accidently being swallowed by the child or infant and another purpose is to clean the back of the teeth. In this respect the teeth of the disk act in the same manner as the teeth or corrugations 4.

The handle member 3 protrudes outwardly of the disk or guard member 2 and at the end thereof is a ball 9 provided with a series of bosses 10 on its face. The function of this feature is to provide additional means to clean or massage the gums or teeth.

Figure 2:
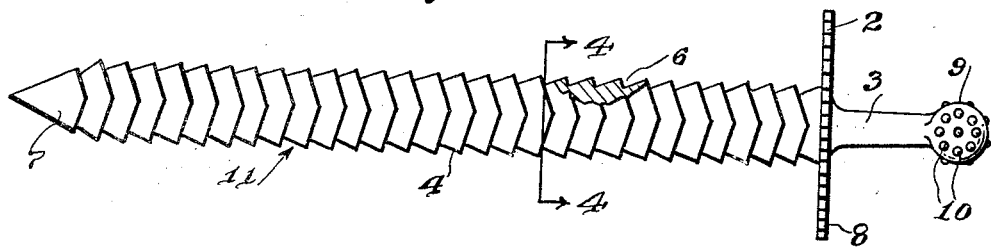
Figure 2 is a modified form of the invention.
Figure 4:
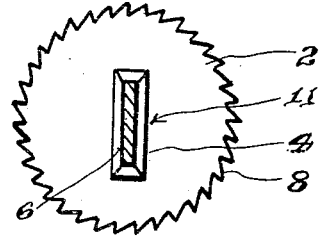
Figure 4 is a section on line 4—4 of Figure 2.

The modified form of the invention shown in Figure 2 is the same as that disclosed in Figure 1 with the exception that the body member 11 is relatively thin and rectangular in shape as indicated in Figure 4.

Figure 5:
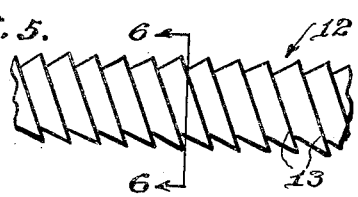
Figure 5 is a fragmentary view of a modified form of the body member.
Figure 6:
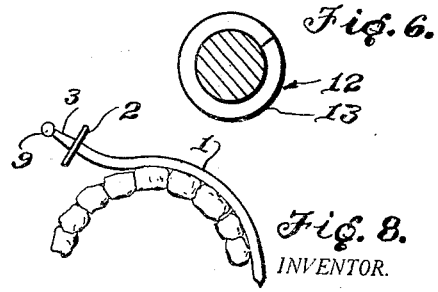
Figure 6 is a section on line 6—6 of Figure 5.

In the modified form of the device shown in Figures 5 and 6 the body member 12 is round in section with the teeth 13 all running diagonally parallel in an unbroken line.

Figure 7:
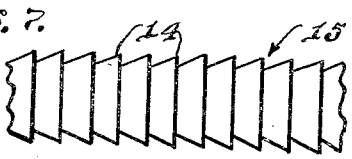
Figure 7 is a fragmentary view of another modification of the invention.

The form of the invention shown in Figure 7 is the same as that disclosed in Figure 1 or 2 with the exception that the teeth or corrugations 14, of the body member 15, all run vertically.

The body member, disk member and handle member are all made or molded from one piece of pure soft Pará rubber so the teeth can be cleaned without any abrasive action. This device will clean the teeth similar to an ordinary bristle brush but without any of its disadvantages. For instance, there is no chance of the brush bristles falling off as in the ordinary brush and perhaps choking the child. The device can easily and completely be cleaned and sterilized and kept sanitary as there is no place for the foreign matter to stick permanently. Due to the inherent flexibility of the body member all the teeth can be reached and cleaned as indicated diagrammatically in Figure 8.

Having described my invention; I claim:

1. In a device of the class described, the combination of a body member provided with pockets for holding a cleaning material, said body member being flexible and capable of being bent to conform to the curvature of the teeth, one end of said body member being pointed while the opposite end is provided with a disk having teeth on its periphery, and a handle member protruding outwardly of said disk.

2. In a device of the class described, the combination of a body member provided with pockets for holding a cleaning material, said body member being flexible and capable of being bent to conform to the curvature of the teeth, one end of said body member being pointed while the opposite end is provided with a disk having teeth on its periphery, and a handle member protruding outwardly of said disk, said handle member being ball shaped at the end and provided with a series of bosses.

In testimony whereof I affix my signature.

FRANKLIN BROWN.